I. N. Stanley.
Gas Main.

No. 2,815. Reissued Dec. 17, 1867.

Witnesses.
M. M. Livingston
Wm. Greenn

Inventor.
I. N. Stanley.

N. PETERS, PHOTO-LITHOGRAPHER, WASHINGTON, D. C.

UNITED STATES PATENT OFFICE.

I. N. STANLEY, OF BROOKLYN, NEW YORK.

IMPROVEMENT IN HYDRAULIC MAINS OF GAS-WORKS.

Specification forming part of Letters Patent No. 57,006, dated August 7, 1866; Reissue No. 2,815, dated December 17, 1867.

*To all whom it may concern:*

Be it known that I, I. N. STANLEY, of Brooklyn, in the county of Kings and State of New York, have invented a new and useful Improvement in Hydraulic Mains for Gas-Works; and I do hereby declare that the following is a full, clear, and exact description thereof, which will enable others skilled in the art to make and use the same, reference being had to the accompanying drawings, forming part of this specification.

The tubes which lead from the retorts into the hydraulic main in gas-works have hitherto been constructed or arranged so as to project downward at their upper ends directly into the main through the top or upper part thereof, and extend below the surface of the fluid therein, thereby monopolizing much room in the main, and serving to materially check the free passage of gas in the main above the fluid in the passage of the gas to the pipe or pipes by which it is conducted into the holder or receiver.

The object of my invention is to obviate this difficulty; and to this end it consists in having the upper parts of the tubes aforesaid cast with or made separate from and attached to the hydraulic main at one or both sides of the same, and made to communicate with the main below the level of the fluid therein, whereby the gas, when it escapes up through fluid in the main, will have a free unobstructed passage in the latter above the fluid.

Figure 3:
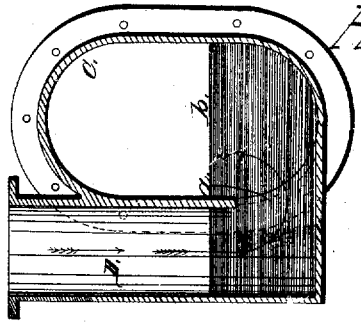
Figure 2:
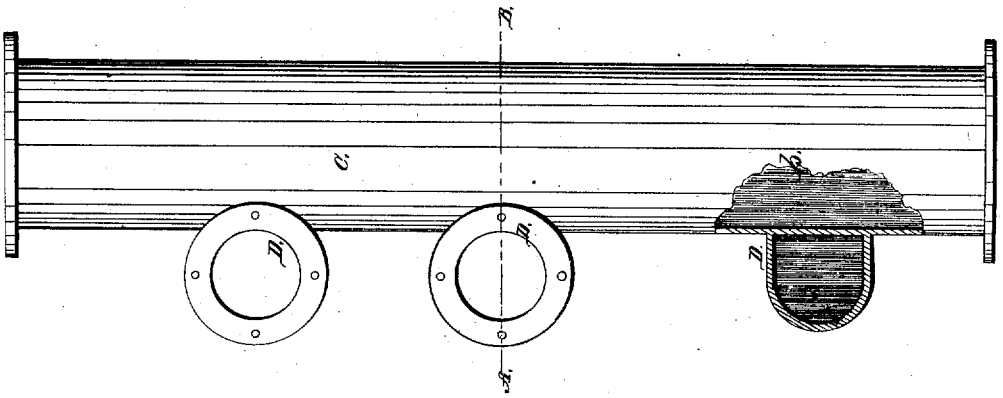
Figure 1:
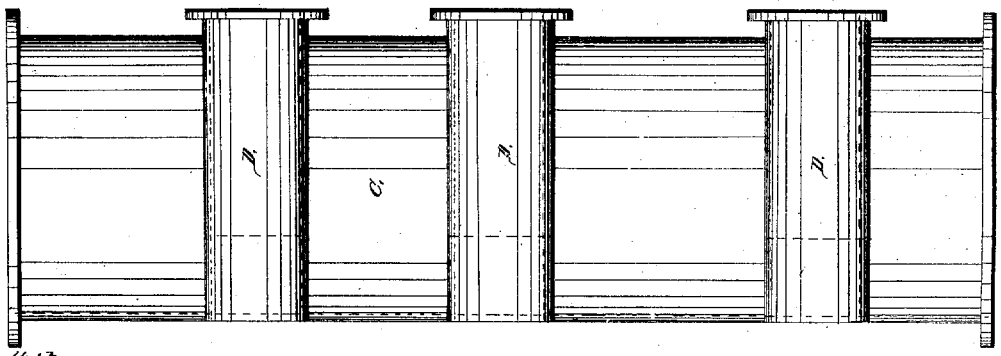

In the accompanying sheet of drawings, Figure 1 is a side view of my invention; Fig. 2, a plan or top view of the same, partly in section; Fig. 3, a vertical transverse section of the same, taken in the line A B, Fig. 2.

Similar letters of reference indicate corresponding parts.

C represents the hydraulic main, which may be cast in the usual form and with a series of tubes, D, at one side of it, at its exterior. These tubes D have openings *a* at their lower parts, by which they communicate with the hydraulic main C, as shown in Fig. 3, the openings *a* being below the surface of the water or fluid *b* in C. The tubes D have extensions connected to them to lead to the retorts. The tubes D may be cast with or made or cast separately from the main and bolted or otherwise secured to the main. These hydraulic mains, as is well known, serve as a seal between the retorts and the holder or receiver, and also serve as a seal between one retort and another, so that the retorts may be charged with coal and emptied of coke separately without interfering one with another.

By my improvement it will be seen that the space in the hydraulic main above the water or fluid *b* is clear or unobstructed, and consequently a free or unobstructed passage is allowed the gas in the main, so that it may readily pass into the pipe or pipes which lead it to the coolers, holders, &c.

The original hydraulic main has its tubes D projecting downward directly into the center of the main and below the surface of the water or fluid *b*, and the tubes greatly obstruct the passage of the gas in the main—a difficulty which is fully obviated by my improvement.

I claim as new and desire to secure by Letters Patent—

As an improvement in hydraulic mains for gas-works, the combination, with the main C, of the external supply-tubes, D, cast with or made separately from and attached to the main, and communicating with the same below the water or fluid therein, substantially as and for the purpose herein set forth.

I. N. STANLEY.

Witnesses:

WM. F. MCNAMARA,

ALEX. F. ROBERTS.